United States Patent [19]

Disteldorf et al.

[11] Patent Number: 4,518,740

[45] Date of Patent: May 21, 1985

[54] MOISTURE-HARDENING VARNISHES WITH AN ISOCYANATE RESIN BASE

[75] Inventors: Josef Disteldorf, Herne; Werner Flakus, Recklinghausen, both of Fed. Rep. of Germany

[73] Assignee: Chemische Werke Huls Aktiengesellshcaft, Marl, Fed. Rep. of Germany

[21] Appl. No.: 609,643

[22] Filed: May 14, 1984

[30] Foreign Application Priority Data

Jun. 24, 1983 [DE] Fed. Rep. of Germany ....... 3322723

[51] Int. Cl.$^3$ .............................................. C08K 3/22
[52] U.S. Cl. .................................. 524/783; 524/872; 528/65; 528/67
[58] Field of Search .................. 524/872, 783; 528/65, 528/67

[56] References Cited

U.S. PATENT DOCUMENTS

| | | | |
|---|---|---|---|
| 3,284,413 | 11/1966 | Heiss | 528/67 |
| 4,234,445 | 11/1980 | Hagen | 528/65 |
| 4,292,350 | 9/1981 | Kubitza et al. | 528/67 |

Primary Examiner—Lewis T. Jacobs
Attorney, Agent, or Firm—Oblon, Fisher, Spivak, McClelland & Maier

[57] ABSTRACT

Moisture-hardening varnishes which have an isocyanate resin base of adducts of a mixture of diisocyanates, wherein the diisocyanate mixture has 88 to 99% by weight of 2-methyl-1,5-diisocyanatopentane and 12 to 1% by weight of 2-ethyl-1,4-diisocyanatobutane.

These varnishes exhibit excellent thermal and oxidative stability and have excellent storage stability. They also exhibit excellent compatibility with solvents, pigments and other auxiliary materials.

8 Claims, No Drawings

MOISTURE-HARDENING VARNISHES WITH AN ISOCYANATE RESIN BASE

BACKGROUNDS OF THE INVENTION

1. Field of the Invention

This invention relates to moisture-hardening varnishes based on derivatives of aliphatic diisocyanate mixtures.

2. Description of the Prior Art

Moisture-hardening resins based on aromatic polyisocyanates are known and can be produced in several manners. Unfortunately, these resins have a tendency to yellow upon exposure to sunlight.

Cyclic polyisocyanates, such as e.g. isophoronediisocyanate or methylene-bis-(4-cyclohexylisocyanate) are used for more demanding applications. However, the isocyanurate or the propanetriol prepolymer of these cyclic diisocyanates merely form hard, brittle films following moisture hardenings.

Based on cyclic polyisocyanates and, e.g., higher molecular polyols, NCO terminated adducts can be produced that provide hard or soft films, in each case elastic films, following moisture hardening. But the resins are inactive and must be activated with additions of, e.g., 0.1 to 0.2% tin catalysts, which limits the weathering resistance of the hardened films. The hardened films have excellent thermal and oxidative stability, but have no outstanding solvent stability.

Aliphatic polyisocyanates through their floating, NCO end groups introduce highly reactive moisture-hardening resins in the form of their isocyanurate or their propanetriol prepolymers, which, following hardening, form hard, elastic weather and solvent resistant films. However, their thermal and oxidative stability and compatibility with other products are problematical, as e.g., also with solvents and pigments which are present especially in cyclic polyisocyanate resins.

Hence, a need clearly continues to exist for moisture-hardening varnishes with both excellent thermal and oxidative stability, and resistance to solvent attack. Also, it is necessary for these moisture-hardening varnishes to have excellent storage stability.

SUMMARY OF THE INVENTION

Accordingly, it is an object of the present invention to provide a moisture-hardening varnish which has excellent thermal and oxidative stability, and which also has excellent solvent stability.

It is also an object of this invention to provide a moisture-hardening varnish which has excellent compatibility with solvents, pigments, reactants or auxiliary products.

According to the present invention, the foregoing and other objects are attained by providing a moisture-hardening varnish with an isocyanate resin base of adducts of a mixture of diisocyanates, wherein said diisocyanate mixture has about 88 to 99% by weight of 2-methyl-1,5-diisocyanatopentane and about 12 to 1% by weight 2-ethyl-1,4-diisocyanatobutane.

DETAILED DESCRIPTION OF THE PREFERRED EMBODIMENTS

According to the present invention, it has now been surprisingly found that resin derivatives of the 2-methyl-1,5-diisocyanatopentane (MPDI)/2-ethyl-1,4-diisocyanatobutane (EBDI) mixture possess quality properties which considerably surpass those of the conventionally used aliphatic isocyanate resins.

The moisture-hardening varnishes with an isocyanate resin base according to this invention contain adducts of a diisocyanate mixture having the composition of about 88 to 99% by weight of 2-methyl-1,5-diisocyanatopentane (MPDI) and about 12 to 1% by weight of 2-ethyl-1,4-diisocyanatobutane (EBDI), according to the following formulas:

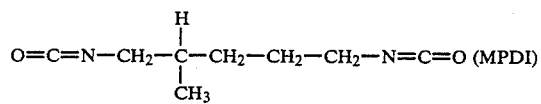

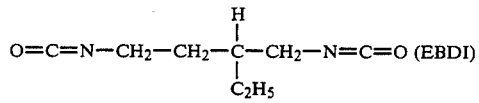

The resins are produced by trimerization of the MPDI/EBDI mixture to the corresponding isocyanatoisocyanurate or by reaction of the MPDI/EBDI mixture with propanetriols in NCO:OH equivalents of about 2:1.

These resins are chemically hardened through the effects of atmospheric moisture and provide films and coatings of superior quality.

The isocyanate mixture is the result of phosgenation of the corresponding diamine mixture, whereby the latter is formed by hydrogenation of the corresponding dinitrile mixture. The mixture is obtained, e.g., as a by-product in the adipodinitrile production through reaction of butadiene with HCN or by dimerization of acrylonitrile.

The isocyanurate or the propanetriol prepolymers here are understood to be adducts.

The moisture-hardening varnishes according to the invention have the following qualities:

1. Thermooxidation stability
2. Storage stability of pigmented systems
3. Compatibility with solvents, pigments, reactants or auxiliary products
4. Solvent resistance The present invention will be further illustrated by certain examples and references which are provided for purposes of illustration only and are not intended to limit the present invention.

The thermooxidation stability of the resins applied according to the invention, as shown in Table 1, is not typical of aliphatic isocyanate resins and comparable with that shown by the indicator diagram of cyclic isocyanate resins.

TABLE 1

Thermooxidation Test with Moisture-hardened Films with Aliphatic Isocyanurate Base
Conditions: 10 min., 240° C.
Evaluation: Color value 1 to 10, according to Gardner

| Initial Resins Isocyanurates Based on | Color Value According to Gardner | |
|---|---|---|
| | Before Test | After Test |
| 1,6-Diisocyanato-hexane (HDI) | 1 | 7–8 |
| 2,2,4/2,4,4-Trimethyl-1,6-diisocyanato-hexane (TMDI) | 1 | 4 |
| 5-Methyl-1,9-diisocyanato-nonane (MNMDI) | 1 | 10 |
| 2-Methyl-1,5-diisocyanato-pentane (MPDI) 2-Ethyl-1,4-diisocyanato- | 1 | 2 |

TABLE 1-continued

Thermooxidation Test with Moisture-hardened Films with
Aliphatic Isocyanurate Base
Conditions: 10 min., 240° C.
Evaluation: Color value 1 to 10, according to Gardner

| Initial Resins Isocyanurates Based on | Color Value According to Gardner Before Test | After Test |
|---|---|---|
| butane (EBDI) Isophoronediisocyanate (IPDI) | 1 | 1–2 |

The storage stability especially of white pigmented resins, which require a high pigment volume concentration, is extraordinary considering the high reactivity of the resins used according to the invention (Table 2).

The results of the severe storage test at 60° C. permit the empirical conclusion of an over 10 times greater shelf life at 25° C.

The very limited storage life of the HDI prepolymers as well as their low gloss value at 20° C. Gardner indicate clear incompatibility of this system with pigments, reaction products and solvents. This incompatibility of HDI prepolymers or additives becomes evident when such prepolymers are to be modified by partial oxyester additives.

Thus, e.g., not only hard substrates, such as metal, concrete and parquet flooring have to be coated but also softer substrates, such as PVC floor coverings and the like. Softer resin adjustments can be made very advantageously if the resin systems according to the invention are chemically reacted with small amounts of oxyester additives and moisture-hardening of the coating takes place only thereafter. Surprisingly, the resins used according to the invention permit such a modification while standard types of aliphatic isocyanates, such as HDI derivatives, coagulate after a few hours' storage at room temperature.

TABLE 3

Oxyester Partially Modified Adducts and Prepolymers of
Aliphatic Isocyanates for Coating of PVC. Film and
Foil Data as Well as Storage Stability. Basic Resin:
Isocyanurate and Propanetriol Prepolymers. To modify
Oxyester Polycaprolactone 210 (PCP) used.

| Resin Component | Film Data | | | Foil Data | | | Storage Life 25° C. (Days) |
|---|---|---|---|---|---|---|---|
| | Pendulum Hardness Acc to Koenig | Erichsen Test [mm] | Abrasion acc to Taber mg H 2 Roll 100 U 500 g Bel. | Tear Resistance N/mm² | Elongation % | Solvent Resistance | |
| 1. HDI—TMP adducts modified with PCP 210 NCO:OH = 11:1 | 177 127 | 8.5 10 | 23.8 31.3 | 78.7 45.7 | 8 10 | resistant to EGA, xylene, MEK, acetone | <2 |
| 2. (MPDI + EBDI)—TMP modified with PCP 210 NCO:OH = 9:1 | 187 130 | 9.5 >10 | 35.1 32.2 | 78.2 48.4 | 7 9 | | >100 |
| 3. Hdi—Isocyanurate modified with PCP 210 NCO:OH = 20:1 | 190 140 | 8.0 9.6 | 33 28 | 53.4 35.2 ± 1.4 | 9 13 | Resistant to EGA, xylene, MEK, acetone | 40 |
| 4. (MPDI EBDI) - modified with PCP 210 NCO:OH = 9:1 | 184 130 | 10.0 10.00 | 43.1 32.2 | 57.3 43.2 | 8 10 | | >40 |

TABLE 2

Basic Resins Trimethylopropane Prepolymers (TMP)
of the following Isocyanates, reacted in OH:NCO
equivalents as 1:2

| Isocyanate Component | (a) Storage Stability 60° C. | (b) Gloss Values Acc to Gardner | | |
|---|---|---|---|---|
| | | 20° C. | 60° C. | 85° C. |
| HDI-Prepolymer | 3–4 days | 40 | 71 | 78 |
| TMDI-Prepolymer | >30 days | 82 | 88 | 97 |
| MNMDI-Prepolymer | 20–25 days | 76 | 91 | 96 |
| (MPDI + EBDI)-Prepolymer | >30 days | 80 | 85 | 95 |

(a) Storage stability of moisture-hardening resins following pigmentation with TiO₂ (Kronos Cl 310) PVK 15
(b) Gloss Values of the Hardened Films In view of the good compatibility of the resins used according to the invention, their excellent solvent resistance is surprising compared with the premium gasoline sensitivity of the well compatible 5-methyl-1,4-dicyanatononane (MMDI) (Table 4).

TABLE 4

Solvent Resistance of Moisture-hardened Films of the Trimethylol Prepolymers of the following Isocyanates, reacted in OH:NCO equivalents = 1:2.

| Isocyanate Component | EGA+ MEK+ Acetone Xylene Abrasion Test 100 Cyclene | Premium gasoline test 1 h, 50° C. Pendulum Hardness acc to Koenig (sec) | |
|---|---|---|---|
| | | Before Test | After Test |
| HDI-prepolymer | no effect whatsoever | 167 | 158 |
| TMDI-prepolymer | no effect whatsoever | 172 | 169 |
| MNMDI-prepolymer | no effect whatsoever | 178 | 52* |
| (MPDI + EBDI)-prepolymer | no effect whatsoever | 177 | 167 |

*Solvent absorption and softening of film
+EGA = ethylene glycol acetate
+MEK = methyl ethyl ketone The resins used according to the invention provide directly applied reactive, cold-hardening, hard but elastic coatings. If necessary, hardening can also take place in the presence of heat.

EXAMPLE 1

134 g of trimethylolpropane (1 mol) and 504 g of a mixture of MPDI and EBDI (3 mol) in 343 g of ethyl glycol acetate are reacted for 6 hours at 80° C.

Yield: 978 g of prepolymer, NCO content: 12.79% (theoretical 12.84%), of a highly viscous, practically colorless resin.

| Resin Preparation: | 65 parts by weight of resin |
|---|---|
| | 35 parts by weight of ethyl glycol acetate |
| | 0.01 part by weight of dibutyltinlaurate (DBTL) |
| | 0.2 parts by weight of diazabicyclooctane (DABCO) |

The following data were obtained following moisture hardening:

| Sheet Steel Data | | | | | Foil Data | |
|---|---|---|---|---|---|---|
| Pendulum Hardness Acc to Koenig [sec] | | | Erichsen | Taber Abrasion Test-H 22 Roll | Tear Resistance | Elongation % |
| 1st Day | 3rd Day | 7th Day | test [mm] | 100 Cyclene 500 g Bel. [mg] | [N/mm²] | |
| 160 | 180 | 193 | 9.8 | 35 | 78.2 | ? |

Solvent resistance to MEK, EGA, xylene, acetone, premium gasoline (1 h, 50° C.)
Sheet steel data resin example 1, however pigmented with TiO₂ (kronos Cl 310) PVK 15

| Pendulum Hardness to Koenig [sec] | | | Erichsen Test [mm] | Gloss Values According to Gardner | | |
|---|---|---|---|---|---|---|
| 1st Day | 3rd Day | 7th Day | | 20° C. | 60° C. | 85° C. |
| 157 | 159 | 171 | 9.0 | 84 | 93 | 95 |

EXAMPLE 2

Triisocyanatoisocyanurate of MPDI and EBDI mixture.
Resin Preparation: 65 parts by weight of isocyanurate (MPDI+EBDI)
NCO content: 16.2%
35 parts by weight of ethyl glycol acetate
0.01 part by weight of DBTL
0.2 parts by weight of DABCO The following data were obtained following moisture-hardening:

| Sheet Steel Data | | | | | Foil Data | |
|---|---|---|---|---|---|---|
| Pendulum Hardness Acc to Koenig [sec] | | | Erichsen | Abrasion Acc to Taber-H 22 Roll 100 | Tear Resistance | Elongation % |
| 1st Day | 3rd Day | 7th Day | Test [mm] | Cyclene 500 g Bel. [mg] | [N/mm²] | |
| 129 | 195 | 200 | 7.1 | 43.1 | 57.3 | 8 |

Solvent resistant to EGA, xylene, MEK, acetone, premium gasoline.

By reaction of the monomer diisocyanate mixture consisting of MPDI and EBDI with linear oxyesters, preferably those of molecular weights of about 1000 in NCO:OH equivalents=2:1, resins are obtained that, following moisture-hardening, form soft, tacky films and are not particularly suitable for immediate use. But these NCO end prepolymers are excellently suited for modification according to examples 1 and 2 to obtain less hard films on flexible substrates:

EXAMPLE 3

1,016.9 g of resin (produced by reaction of PCP 210 with (MPDI+EBDI) in the equivalence ratio OH:NCO=1:2) NCO content: 4.13%; and 2,616.8 of resin according to example 1 are homogenized and provide the following data after moisture-hardening:

| Sheet Steel Data | | | Foil Data | |
|---|---|---|---|---|
| Pendulum Hardness Acc to Koenig [sec] 15 min 150° C. | Erichsen Test [mm] | Abrasion Acc to T H 22 Roll 100 Cyclene 500 g Bel. [mg] | Tear Resistance [N/mm²] | Elongation % |
| 148 | >12 | 32 | 48.8 | 13 |

Solvent resistant to EGA, MEK, acetone, xylene.

EXAMPLE 4

Analogously to example 3, both resins are mixed but in a 1:1 ratio.

The following data are obtained following moisture-hardening:

| Sheet Steel Data | | | |
| --- | --- | --- | --- |
| Pendulum Hardness Acc to Koenig [sec] 15 min 150° C. | Erichsen Test [mm] | Foil Data | |
| | | Tear Resistance [N/mm²] | Elongation % |
| 77 | >12 | 19.1 | 35 |

EXAMPLE 5

Analogous mixtures according to examples 3 and 4 of the isocyanurate (MPDI+EBDI) and of the linear prepolymer (produced by reactions of PCP 210 with MPDI/EBDI mixtures in OH:HCO equivalents 1:2) following moisture-hardening provide numerically analogously equivalent sheet steel and foil data.

The outstanding performance of the adducts of the MPDI/EBDI mixture used according to the invention result from the fact that oxyester prepolymers as shown in example 6 provide high reactivity, good compatibility, and remarkable mechanical film data but are inadequate as regards storage stability and solvent resistance.

EXAMPLE 9

Prepolymer produced from 210 g of oxyester (1 mol of TMP, 2 mol of PS, 2 mol of HMG)

OHZ=266.7

168 g of MPDI/EBDI 378 g of ethyl glycol acetate (PA=phthalic acid; HMG=hexamethylene glycol)

Colorless resin, NCO content: 5.55%

Following catalytic activation with 0.02% DBTL and 0.2% DABCO and moisture-hardening, the following film data and properties have been determined.

| Pendulum Hardness Acc to Koenig [sec] | | | Erichsen Test [mm] | Solvent Resistance | Storage Stability at Room Temperature |
| --- | --- | --- | --- | --- | --- |
| 1st Day | 3rd Day | 7th Day | | | |
| 113 | 133 | 170 | >10.0 | Resistant to EGA, xylene susceptible to MEK, acetone and premium gasoline | Clear varnish about 6 months; pigmented systems about 4 weeks |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. Moisture-hardening varnishes which comprise adducts of a mixture of diisocyanates, wherein said diisocyanate mixture comprise about 88 to 99% by weight of 2-methyl-1,5-diisocyanato-pentane, and about 12 to 1% by weight of 2-ethyl-1,4-diisocyanatobutane.

2. The moisture-hardening varnishes as in claim 1, wherein the isocyanurate of the diisocyanate mixture is the adduct.

3. The moisture-hardening varnishes as in claim 1, wherein propanetriol prepolymers of the diisocyanate mixture are used as the adducts.

4. The moisture-hardening varnishes as in claim 1, which further comprises a $TiO_2$ pigment.

5. The moisture-hardening varnishes as in claim 1, which further comprises an oxyester additive.

6. The moisture-hardening varnishes as in claim 5, wherein said oxyester additive is a polycaprolactone.

7. The moisture-hardening varnishes as in claim 2, wherein said isocyanurate adduct is formed by the trimerization of said 2-methyl-1,5-diisocyanatopentane and 2-ethyl-1,4-diisocyanatobutane mixture.

8. The moisture-hardening varnishes as in claim 3, wherein the reaction of the diisocyanate mixture with propanetriol is such that the ratio of NCO:OH equivalents is about 2:1.

* * * * *